Patented Apr. 3, 1945

2,372,895

UNITED STATES PATENT OFFICE 2,372,895

VULCANIZATION OF RUBBER

Marion W. Harman, Nitro, W. Va., assignor to Monsanto Chemical Company, St. Louis, Mo., a corporation of Delaware No Drawing. Application April 27, 1943, Serial No. 484,782

18 Claims. (Cl. 260—793)

The present invention relates to a new and improved class of rubber vulcanization accelerators, to a process of vulcanizing a rubber or a rubber containing material and to the vulcanized rubber products obtained with the aid of the new accelerators.

The accelerators of the present invention comprise N-cyano alkyl substituted dithiocarbamic acids and their derivatives. In accordance with this invention it has been discovered that compounds containing the grouping

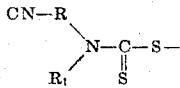

where R is an alkylene group and R' is an alkyl group are valuable accelerators. The alkyl group may be of the straight chain type or the alicyclic type as for example cyclohexyl or an aryl substituted alkyl group as for example benzyl or other group having an alkyl carbon atom attached to the nitrogen atom. Since the free dithiocarbamic acids are unstable substances they are used in the form of their derivatives particularly primary, secondary and tertiary amine salts, metallic salts, thiuram monosulfides, disulfides and polysulfides.

Carbon disulfide combines readily with cyano substituted secondary alkyl amines to form cyano alkyl substituted secondary amine salts of the cyano alkyl substituted dithiocarbamic acid. If the reaction is carried out in the presence of a tertiary amine, as for example N-N-dimethyl cyclohexyl amine, a tertiary amine salt is formed and in the presence of alkali metal hydroxide the alkali metal salts are formed. These too are useful accelerators. Particularly valuable are the heavy metal salts, as for example zinc and lead salts, and thiuram sulfides. The former are precipitated upon the addition of a soluble salt of the heavy metal to an aqueous alkaline solution of the dithiocarbamic acid. Thiuram disulfides are prepared by oxidation in aqueous alkaline solution of the dithiocarbamic acids and the thiuram monosulfides result from the removal of one atom of sulfur from the thiuram disulfide in known manner. Thiuram polysulfides may be prepared by the action of sulfur chlorides on the dithiocarbamic acids. Obviously, other methods of synthesis may be employed where convenient or desirable and this invention is not limited to the process by which the new accelerators are manufactured.

Typical examples of the new accelerators which illustrate the invention but are not to be taken as limiting the invention are the amine and metallic salts, and the thiuram sulfides from the following dithiocarbamic acids: N-β-cyano ethyl, N-methyl dithiocarbamic acid; N-β-cyano ethyl N-ethyl dithiocarbamic acid; N-β-cyano n-propyl, N-ethyl dithiocarbamic acid; N-β-cyano isopropyl, N-ethyl dithiocarbamic acid; N-β-cyano ethyl, N-n-propyl dithiocarbamic acid; N-β-cyano ethyl, N-isopropyl dithiocarbamic acid; N-β-cyano n-propyl, N-n-propyl dithiocarbamic acid; N-β-cyano isopropyl, N-ispropyl dithiocarbamic acid; N-β-cyano ethyl, N-n-butyl dithiocarbamic acid; N-β-cyano ethyl, N-sec. butyl dithiocarbamic acid; N-β-cyano ethyl, N-tertiary butyl dithiocarbamic acid; N-β-cyano ethyl, N-isobutyl dithiocarbamic acid; N-β-cyano n-propyl, N-n-butyl dithiocarbamic acid; N-β-cyano ethyl, N-n-amyl dithiocarbamic acid; N-β-cyano ethyl, N-isoamyl dithiocarbamic acid; N-β-cyano ethyl, N-tertiary amyl dithiocarbamic acid; N-β-cyano ethyl, N-hexyl dithiocarbamic acid; N-β-cyano ethyl, N-octyl dithiocarbamic acid; N-β-cyano ethyl, N-n-nonyl dithiocarbamic acid; N-β-cyano ethyl, N-2-nonyl dithiocarbamic acid; N-β-cyano ethyl, N-decyl dithiocarbamic acid; N-β-cyano ethyl, N-n-undecyl dithiocarbamic acid; N-β-cyano ethyl, N-2-undecyl dithiocarbamic acid; N-β-cyano ethyl, N-dodecyl dithiocarbamic acid; N-β-cyano ethyl, N-pentadecyl dithiocarbamic acid; N-β-cyano n-propyl, N-allyl dithiocarbamic acid; N-β-cyano isopropyl, N-β-hydroxy ethyl dithiocarbamic acid; N-cyano methyl, N-β-hydroxy ethyl dithiocarbamic acid; N-α-cyano n-butyl, N-β-hydroxy n-propyl dithiocarbamic acid; N-β-cyano isopropyl, N-benzyl dithiocarbamic acid; N-β-cyano ethyl, N-chlorbenzyl dithiocarbamic acid; di(N-β-cyano ethyl) dithiocarbamic acid and equivalents and analogues thereof.

An important group of cyano substituted secondary alkyl amines useful for the preparation of the new accelerators can be prepared from primary alkyl amines and unsaturated open chain nitriles as described in United States Patent No. 1,992,615 granted to Hoffmann et al. The method comprises mixing equimolecular proportions of an unsaturated open chain nitrile and a primary alkyl amine or reacting two molecular proportions of an unsaturated nitrile with ammonia. Other methods of synthesis are described in United States Patent No. 1,972,465 granted to Ulrich et al. The following examples illustrate the preparation of the new accelerators but again are not to be taken as limitative of the invention.

Into a suitable container fitted with a reflux condenser there was charged substantially 304 parts by weight of β-cyano ethyl cyclohexyl amine (substantially two molecular proportions) and substantially 76 parts by weight of carbon disulfide (substantially one molecular proportion). An exothermic reaction set in immediately. The product was an amber resin believed to be the N-β-cyano ethyl N-cyclohexyl amine salt of N-β-cyano ethyl N-cyclohexyl dithiocarbamic acid. The yield was substantially quantitative or 380 parts by weight. In similar manner were prepared the N-β-cyano ethyl, N-n-butyl amine salt of N-β-cyano ethyl, N-n-butyl dithiocarbamic acid; the N-β-cyano ethyl, N-ispropyl amine salt of N-β-cyano ethyl, N-isopropyl dithiocarbamic acid; the N-β-cyano ethyl, N-n-amyl amine salt of N-β-cyano ethyl, N-n-amyl dithiocarbamic acid; the N-β-cyano ethyl, N-allyl amine salt of N-β-cyano ethyl, N-allyl dithiocarbamic acid and the N-β-cyano ethyl, N-dodecyl amine salt of N-β-cyano ethyl, N-dodecyl dithiocarbamic acid. The products were syrupy liquids and were obtained in substantially quantitative yield. On standing the β-cyano ethyl, dodecyl amine derivative set to a jelly and the β-cyano ethyl ispropyl amine derivative crystallized to a soft solid.

Into a suitable container fitted with a reflux condenser there was charged substantially 83.5 parts by weight (substantially 0.6 molecular proportion) of aqueous 33% ethyl amine and substantially 32.5 parts by weight (substantially 0.6 molecular proportion) of acrylonitrile. The nitrile was gradually added to the amine at 10-15° C. upon which an exothermic reaction set in. The charge was stirred for a short time at room temperature and substantially 23 parts by weight of carbon disulfide (substantially 0.3 molecular proportion) added to the clear colorless solution. The water and any unreacted carbon disulfide were removed by evaporation or other means leaving a residue of viscous yellow resin in nearly quantitative yield believed to be the N-β-cyano ethyl N-ethyl amine salt of N-β-cyano ethyl N-ethyl dithiocarbamic acid.

Into a suitable container fitted with a reflux condenser there was charged substantially 42.8 parts by weight of benzyl amine and substantially 21.2 parts by weight of acrylonitrile (substantially 0.4 molecular proportion of each). The charge was heated at 100-110° C. for about an hour, cooled below 50° C. and 15.2 parts by weight (substantially 0.2 molecular proportion) of carbon disulfide added while keeping the temperature below 50° C. The product was a clear brittle resin believed to be the N-β-cyano ethyl N-benzyl amine salt of N-β-cyano ethyl N-benzyl dithiocarbamic acid. The yield was nearly quantitative.

Into a suitable reaction vessel fitted with a reflux condenser there was charged 53 parts by weight of acrylonitrile (substantially one molecular proportion) and substantially 50 parts by weight of aqueous 60% ethylene diamine (substantially 0.5 molecular proportion). The temperature was kept below 60° C. and after the strong exothermic reaction had subsided, the charge was stirred until it had cooled to room temperature. Substantially equimolecular proportions of the di(N-β-cyano ethyl) ethylene diamine so obtained and carbon disulfide were mixed keeping the temperature below 50° C. A viscous yellow oil formed immediately which set up to a clear resin. This product was believed to be an inner salt of N-β-cyano ethyl N-(β-cyano ethyl) amino ethyl dithiocarbamic acid, presumably of the structure

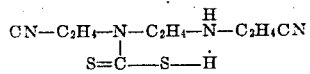

An aqueous solution of the sodium salt of N-β-cyano ethyl N-n-butyl dithiocarbamic acid was prepared by mixing with cooling substantially 31.5 parts by weight (0.25 molecular proportion) of N-β-cyano ethyl N-n-butyl amine, 40 parts by weight of 25% sodium hydroxide, 125 parts by weight of water and 19 parts by weight (substantially 0.25 molecular proportion) of carbon disulfide. The temperature was kept at 20-30° during the reaction and the thiuram sulfide prepared by slowly adding to the clear yellow solution with further cooling an oxidizing mixture consisting of 16.9 parts by weight of 26.6% hydrogen peroxide, 13.1 parts by weight of 66° sulfuric acid and 125 parts by weight of water. The temperature was kept at 10-15° C. during the oxidation. A viscous brown syrup separated from which the aqueous layer was decanted and the syrup washed with water, taken up in ether or other solvent, dried and the solvent evaporated. The viscous syrupy residue obtained in about 90% yield was believed to be di(N-β-cyano ethyl N-n-butyl) thiuram disulfide. Sulfur calculated for $C_{16}H_{26}N_4S_4$ 31.8%; found 30.1%. Nitrogen calculated 13.9%; found 14.2%.

Substantially 36 parts by weight (substantially 0.125 molecular proportion) of $ZnSO_4.7H_2O$ in 250 parts by weight of water was added to an aqueous solution containing 0.25 molecular proportion of the sodium salt of N-β-cyano ethyl N-n-butyl dithiocarbamic acid prepared as described above. The zinc salt precipitated in nearly quantitative yield as a soft colorless solid.

In similar manner the zinc salt of N-β-cyano ethyl N-methyl dithiocarbamic acid was prepared by precipitating with zinc sulfate from an aqueous solution of the sodium salt. The product was a cream colored solid. The zinc salt of N-β-cyano ethyl N-cyclohexyl dithiocarbamic acid prepared in the same manner was a voluminous white powder. Analysis for sulfur, nitrogen and zinc gave values of 25.15%, 10.88% and 12.76% respectively. The required values for

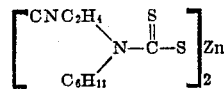

are sulfur 24.66%, nitrogen 10.79% and zinc 12.59%.

Substantially 15.2 parts by weight of cyclohexylamino propionitrile B. P. 125-127/7 mm. obtained by the reaction of cyclohexylamine and propionitrile (substantially 0.1 molecular proportion) and substantially 12.7 parts by weight of N,N dimethyl cyclohexylamine (substantially 0.1 molecular proportion) were charged into a glass or glass lined vessel of suitable capacity and dissolved in ether or other solvent. The solution was cooled to 20-30° C. and 7.6 parts by weight of carbon disulfide (substantially 0.1 molecular proportion) added thereto. After standing a short time crystals began to deposit on the sides and bottom of the container. The solution was cooled to 15° C., the crystalline product filtered off, washed with ether and dried. Snow white crystals M. P. 103-104° were obtained. Analysis for sulfur and nitrogen gave 18.00% sulfur and 12.05% nitrogen. The calculated values for the N,N-dimethyl cyclohexylamine salt of N-β-cyano ethyl N-cyclohexyl dithiocarbamic acid are 18.03% sulfur and 11.83% nitrogen.

Substantially 54.5 parts by weight of 90% sodium cyanide was dissolved in substantially 100 parts by weight of water and the solution cooled to 5-10° C. 166 parts by weight of approximately 30% sulfuric acid was added slowly, keeping the temperature below 10° C. 73 parts by weight of butyl amine (substantially one molecular proportion) was added and then 81.8 parts by of 36.7% formaldehyde. The temperature was kept at 5-15° C. throughout the addition of these reagents. The charge was heated for one hour at 50° C., cooled to 10° C. and the upper organic layer poured off and dried over anhydrous sodium sulfate. The oil was distilled collecting the fraction boiling at 77°-80° C. at 6 mm. A water white oil was obtained which was found to contain 25.08% nitrogen. The value calculated for N-cyano methyl butyl amine was 25.00% nitrogen.

Substantially 22.4 parts by weight of N-cyano methyl butyl amine, 32 parts by weight of 25% caustic soda and 250 parts by weight of water were charged into a vessel of suitable capacity and the charge cooled to 15° C. Substantially 15.2 parts by weight of carbon disulfide was then added keeping the temperature at 15-25° C. After the carbon disulfide had entered into reaction an aqueous solution containing 18.1 parts by weight of 89% zinc sulfate was added. A white powder precipitated which was filtered off and dried in an oven. The product was believed to be the zinc salt of N-cyano methyl N-butyl dithiocarbamic acid.

Substantially 22.4 parts by weight of N-β-cyano isopropyl N ethyl amine B. F. 77-78/14 mm. (Bull. Soc. Belgique 32, 256 (1923)) and 32 parts by weight of 25% caustic soda (substantially 0.2 molecular proportions of each) and 250 parts by weight of water were charged into a vessel of suitable capacity. Substantially 15.2 parts by weight (0.2 molecular proportion) of carbon disulfide was added and the charge stirred for about three hours. A dilute aqueous solution containing 18.1 parts by weight of 89% zinc sulfate (substantially 0.1 molecular proportion) was added. A precipitate formed which was filtered off, washed free of sulfates and dried. A pale yellow powder was obtained believed to be the zinc salt of N-β-cyano isopropyl N-ethyl dithiocarbamic acid.

The examples given below illustrate the accelerating action of the new compounds and are not to be considered as limiting the invention.

As specific embodiments of the invention typical members of the new class of accelerators were incorporated into the formula comprising

| | Parts by weight |
|---|---|
| Buna S rubber [1] | 100 |
| Carbon black | 50 |
| Zinc oxide | 5 |
| Sulfur | 2 |
| Stearic acid | 0.5 |
| Accelerator | 0.5 |

[1] Buna S is the copolymer of butadiene-1,3 and styrene.

In this manner stocks were compounded containing as the accelerator

| Stock | Accelerator |
|---|---|
| A | N-β-cyano ethyl N-n-butyl amine salt of N-β-cyano ethyl N-n-butyl dithiocarbamic acid. |
| B | N-β-cyano ethyl N-cyclohexyl amine salt of N-β-cyano ethyl N-cyclohexyl dithiocarbamic acid. |
| C | N-β-cyano ethyl N-β-hydroxy ethyl amine salt of N-β-hydroxy ethyl N-β-cyano ethyl dithiocarbamic acid. |
| D | Inner salt of N-β-cyano ethyl, N-β-(β-cyano ethyl) amino ethyl dithiocarbamic acid. |
| E | N-β-cyano ethyl N-methyl amine salt of N-β-cyano ethyl N-methyl dithiocarbamic acid. |
| F | N-β-cyano ethyl N-ethyl amine salt of N-β-cyano ethyl N-ethyl dithiocarbamic acid. |
| G | N-β-cyano ethyl N-allyl amine salt of N-β-cyano ethyl, N-allyl dithiocarbamic acid. |
| H | N-β-cyano ethyl N-benzyl amine salt of N-β-cyano ethyl, N-benzyl dithiocarbamic acid. |
| J | N-β-cyano ethyl N-dodecyl amine salt of N-β-cyano ethyl N-dodecyl dithiocarbamic acid. |
| K | N-β-cyano ethyl N-isopropyl amine salt of N-β-cyano ethyl N-isopropyl dithiocarbamic acid. |
| L | N-β-cyano ethyl N-n-amyl amine salt of N-β-cyano ethyl N-n-amyl dithiocarbamic acid. |

The stocks so compounded were cured by heating for different periods of time in a press at the temperature of 45 pounds steam pressure per square inch. The modulus and tensile properties of the 180 minute cure are set forth below to illustrate the accelerating properties.

| Stock | Modulus of elasticity at 400% elongation in lbs./in.² | Tensile at break in lbs./in.² | Ultimate elongation, per cent |
|---|---|---|---|
| A | 835 | 990 | 475 |
| B | 1,410 | 1,740 | 475 |
| C | 805 | 1,005 | 410 |
| D | 795 | 955 | 485 |
| E | 1,130 | 1,130 | 400 |
| F | 1,245 | 1,305 | 420 |
| G | 935 | 1,215 | 515 |
| H | 1,245 | 1,465 | 470 |
| J | 995 | 1,285 | 505 |
| K | 1,980 | 2,220 | 445 |
| L | 1,665 | 1,865 | 455 |

In general, the new accelerators of this invention are characterized by the absence of scorch or pre-vulcanization of the rubber stocks in which they are incorporated. Thus, uncured stocks were tested with a Williams' plastometer described by Williams, Industrial and Engineering Chemistry for 1924, vol. 16, p. 362—see also Krall ibid., vol. 16, p. 922. Samples of uncured stock were heated at 121° C. and the time required for the stock to show a set-up or scorch was determined. Typical data are set forth below:

| Stock | Hours heating to scorch |
|---|---|
| G | 4 |
| H | 3 |
| J | 3 |
| K | 2 |
| L | 2 |

This data shows that the rubber stocks containing the new accelerators are resistant to pre-vulcanization. A similar stock containing a commercial accelerator noted for its marked delayed action set-up in 4 hours.

As further specific embodiments of the invention other stocks were compounded comprising:

|  | Stock | | | | |
|---|---|---|---|---|---|
|  | M | N | O | P | R |
|  | Parts by weight | Parts by weight | Parts by weight | Parts by weight | Parts by weight |
| Buna S rubber | 100 | 100 | 100 | 100 | 100 |
| Carbon black | 50 | 50 | 50 | 50 | 50 |
| Zinc oxide | 5 | 5 | 5 | 5 | 5 |
| Sulfur | 3 | 3 | 3 | 3 | 3 |
| Stearic acid | 0.5 | 0.5 | 0.5 | 0.5 | 0.5 |
| Di (N-β-cyano ethyl N-n-butyl) thiuram disulfide | 0.5 | | | | |
| Di (N-β-cyano ethyl N-cyclohexyl) thiuram disulfide | | 0.5 | | | |
| Zinc N-β-cyano ethyl, N-methyl dithiocarbamate | | | 0.5 | | |
| Zinc N-β-cyano ethyl, N-cyclohexyl dithiocarbamate | | | | 0.5 | |
| Zinc N-β-cyano ethyl, N-n-butyl dithiocarbamate | | | | | 0.5 |

The stocks so compounded were cured in the usual manner by heating in a press at the temperature of 45 pounds steam pressure per square inch. The modulus and tensile properties of the cured products are set forth below.

| Stock | Cure time in mins. | Modulus of elasticity at 400% elongation in lbs./in.² | Tensile at break in lbs./in.² | Ultimate elongation, per cent |
|---|---|---|---|---|
| M | 60 | 2,660 | 2,975 | 435 |
| N | 60 | 1,905 | 2,900 | 550 |
| O | 60 | 2,040 | 2,525 | 470 |
| P | 60 | 2,310 | 2,440 | 425 |
| R | 60 | | 2,000 | 365 |
| M | 120 | 2,810 | 3,050 | 420 |
| N | 120 | 2,235 | 3,025 | 505 |
| O | 120 | 2,090 | 2,905 | 520 |
| P | 120 | 2,640 | 2,640 | 420 |
| R | 120 | | 1,940 | 335 |

The foregoing data show that the new compounds possess desirable accelerating action.

As further illustrative of the invention stocks were compounded comprising

|  | Stock | | | |
|---|---|---|---|---|
|  | S | T | U | V |
|  | Parts by weight | Parts by weight | Parts by weight | Parts by weight |
| Buna S rubber | 100 | 100 | 100 | 100 |
| Carbon black | 50 | 50 | 50 | 50 |
| Zinc oxide | 5 | 5 | 5 | 5 |
| Sulfur | 2 | 4 | 5 | 6 |
| Stearic acid | 0.5 | 0.5 | 0.5 | 0.5 |
| N-β-cyano ethyl N-cyclohexyl amine salt of N-β-cyano ethyl N-cyclohexyl dithiocarbamic acid | 0.6 | 0.333 | 0.333 | 0.333 |

The stocks so compounded were cured in the usual manner by heating for different periods of time in a press at the temperature of 45 pounds of steam pressure per square inch.

| Stock | Cure time in mins. | Modulus of elasticity at 400% elongation in lbs./in.² | Tensile at break in lbs./in.² | Ultimate elongation, percent |
|---|---|---|---|---|
| S | 60 | 1,400 | 1,770 | 490 |
| T | 60 | 1,315 | 2,140 | 590 |
| U | 60 | 1,805 | 2,640 | 550 |
| V | 60 | 2,150 | 2,470 | 445 |
| S | 90 | 1,845 | 2,280 | 475 |
| T | 90 | 1,670 | 2,490 | 540 |
| U | 90 | 2,215 | 2,790 | 475 |
| V | 90 | 2,710 | 2,710 | 400 |

These results show that the new accelerators are powerful accelerators of the vulcanization of Buna S rubber when employed in a formula containing a high sulfur ratio.

As further illustrative of the invention stocks were compounded comprising

|  | Stock | | |
|---|---|---|---|
|  | W | X | Y |
|  | Parts by weight | Parts by weight | Parts by weight |
| Hycar OR rubber [1] | 100 | 100 | 100 |
| Gastex | 50 | 50 | 50 |
| Zinc oxide | 5 | 5 | 5 |
| Stearic acid | 1.5 | 1.5 | 1.5 |
| Sulfur | 1.0 | 1.0 | 1.0 |
| N-β-cyano ethyl N-butyl amine salt of N-β-cyano ethyl N-butyl dithiocarbamic acid | 0.3 | | |
| N-β-cyano ethyl N-cyclohexylamine salt of N-β-cyano ethyl N-cyclohexyl dithiocarbamic acid | | 0.3 | |
| N-β-cyano ethyl N-hydroxy ethyl amine salt of N-β-cyano ethyl N-β-hydroxy ethyl dithiocarbamic acid | | | 0.3 |

[1] Hycar OR is the copolymer of butadiene-1,3 and acrylonitrile.

The stocks so compounded were cured by heating in a press at the temperature of 60 pounds steam pressure per square inch.

| Stock | Cure time in mins. | Modulus of elasticity at 400% elongation in lbs./in.² | Tensile at break in lbs./in.² | Ultimate elongation, per cent |
|---|---|---|---|---|
| W | 30 | 2,450 | 2,890 | 520 |
| X | 30 | 2,250 | 2,815 | 565 |
| Y | 30 | 2,280 | 2,790 | 530 |
| W | 45 | 2,740 | 2,810 | 420 |
| X | 45 | 2,600 | 2,910 | 510 |
| Y | 45 | 2,680 | 2,950 | 465 |

These results show that the new compounds are valuable accelerators for use in Hycar OR.

As further specific embodiments of the invention the new compounds were incorporated in an india rubber formula comprising

| | Parts by weight |
|---|---|
| Smoked sheets rubber | 100 |
| Zinc oxide | 5 |
| Sulfur | 3 |
| Stearic acid | 0.5 |
| Accelerator | 0.3 |

Stocks were compounded containing as the accelerator:

| Stock | Accelerator |
|---|---|
| Z-1 | Di(N-β-cyano ethyl N-n-butyl) thiuram disulfide. |
| Z-2 | Di(N-β-cyano ethyl N-cyclohexyl) thiuram disulfide. |
| Z-3 | Zinc N-β-cyano ethyl, N-methyl dithiocarbamate. |
| Z-4 | Zinc N-β-cyano ethyl, N-cyclohexyl dithiocarbamate. |
| Z-5 | Zinc N-β-cyano ethyl, N-n-butyl dithiocarbamate. |
| Z-6 | N,N dimethyl cyclohexyl amine salt of N-cyclohexyl N-β-cyano ethyl dithiocarbamic acid. |
| Z-7 | N-β-cyano ethyl, N-n-butyl amine salt of N-β-cyano ethyl, N-n-butyl dithiocarbamic acid. |
| Z-8 | N-β-cyano ethyl, N-cyclohexyl amine salt of N-β-cyano ethyl, N-cyclohexyl dithiocarbamic acid. |

The stocks so compounded were cured in the usual manner by heating for different periods of time in a press at the temperature of 30 pounds steam pressure per square inch.

| Stock | Cure time in mins. | Modulus of elasticity at elongation of 500% in lbs./in.² | Tensile at break in lbs./in.² | Ultimate elongation, per cent |
|---|---|---|---|---|
| Z-1 | 15 | 780 | 3,485 | 720 |
| Z-2 | 15 | 555 | 2,750 | 740 |
| Z-3 | 15 | 305 | 1,750 | 810 |
| Z-4 | 15 | 750 | 3,250 | 720 |
| Z-5 | 15 | 880 | 3,800 | 715 |
| Z-6 | 15 | 575 | 2,305 | 700 |
| Z-1 | 30 | 980 | 3,825 | 715 |
| Z-2 | 30 | 740 | 3,510 | 725 |
| Z-3 | 30 | 410 | 2,325 | 785 |
| Z-4 | 30 | 810 | 3,650 | 720 |
| Z-5 | 30 | 880 | 3,290 | 700 |
| Z-6 | 30 | 650 | 3,195 | 735 |
| Z-7 | 60 | 315 | 2,120 | 805 |
| Z-8 | 60 | 630 | 3,020 | 740 |
| Z-7 | 90 | 345 | 2,450 | 795 |
| Z-8 | 90 | 570 | 3,030 | 755 |

These results show that the new accelerators possess strong accelerating action in typical india rubber formulas.

The preferred compounds function as valuable accelerators of the vulcanization of butyl rubber, a copolymer of isobutylene and a small proportion of a diolefin. As specific embodiments of the invention illustrating this use but again without limiting the invention stocks were compounded comprising

| | Stock | | | |
|---|---|---|---|---|
| | A-1 | A-2 | A-3 | A-4 |
| Butyl rubber | 100 | 100 | 100 | 100 |
| Carbon black | 50 | 50 | 50 | 50 |
| Zinc oxide | 5 | 5 | 5 | 5 |
| Stearic acid | 3 | 3 | 3 | 3 |
| Sulfur | 1.5 | 1.5 | 1.5 | 1.5 |
| Zinc salt of N-β-cyano ethyl N-n-butyl dithiocarbamic acid | 1.0 | | | |
| Zinc salt of N-β-cyano ethyl, N-cyclohexyl dithiocarbamic acid | | 1.0 | | |
| Di(N-β-cyano ethyl, N-cyclohexyl) thiuram disulfide | | | 1.0 | |
| N-β-cyano ethyl, N-isopropyl amine salt of N-β-cyano ethyl N-isopropyl dithiocarbamic acid | | | | 1.0 |

The stocks so compounded were vulcanized in the usual manner by heating in a press at the temperature of 60 pounds of steam pressure per square inch (307° F.).

| Stock | Cure time in mins. | Modulus of elasticity in lbs./in.² at elongations of— | | Tensile at break in lbs./in.² | Ultimate elongation, percent |
|---|---|---|---|---|---|
| | | 500% | 700% | | |
| A-1 | 30 | 600 | 1,270 | 1,659 | 840 |
| A-2 | 30 | 470 | 1,030 | 1,330 | 900 |
| A-3 | 30 | 420 | 820 | 1,400 | 920 |
| A-4 | 30 | 360 | 780 | 1,450 | 985 |
| A-1 | 60 | 750 | 1,490 | 1,870 | 820 |
| A-2 | 60 | 640 | 1,360 | 1,720 | 820 |
| A-3 | 60 | 550 | 1,120 | 1,700 | 870 |
| A-4 | 60 | 480 | 1,030 | 1,670 | 910 |

The above data show the valuable accelerating action of the new compounds in butyl rubber.

In another specific example of the invention a stock was compounded comprising

Stock B-1
Parts by weight
Buna S rubber _____ 100
Carbon black _____ 40
Zinc oxide _____ 5
Sulfur _____ 2
Stearic acid _____ 0.5
Softener¹ _____ 10
Cyclohexyl amino thio benzothiazole _____ 1
Zinc N-β-cyano ethyl N-cyclohexyl dithiocarbamate _____ 0.25

¹ The softener was the condensation product of three molecular proportions of acetone with one molecular proportion of ethanol amine and an aromatic type hydrocarbon softener in equal proportions.

The stock so compounded was given a dry heat cure by placing it in a bomb under 25 pounds air pressure per square inch and heating at 287° F. for 45 minutes. The physical properties of the cured product were as follows:

| Stock | Modulus of elasticity in lbs./in.² at elongation of 300% | Tensile at break in lbs./in.² | Ultimate elongation, per cent |
|---|---|---|---|
| B-1 | 985 | 1,320 | 450 |

The above data show that the new accelerators may be used with other type accelerators as activators thereof and further that they are useful for accelerating vulcanization by dry heat.

Stocks were compounded comprising

| | Stock | |
|---|---|---|
| | C-1 | C-2 |
| | Parts by weight | Parts by weight |
| Smoked sheets rubber | 100 | 100 |
| Carbon black | 50 | 50 |
| Zinc oxide | 5 | 5 |
| Sulfur | 3 | 3 |
| Pine tar | 2 | 2 |
| Stearic acid | 3 | 3 |
| Condensation product of acetone and p-amino diphenyl | 1 | 1 |
| Zinc N-β-cyano isopropyl N-ethyl dithiocarbamate | 1.0 | |
| Di(N-β-cyano ethyl N-butyl) thiuram monosulfide | | 1.0 |

The stocks so compounded were cured in the usual manner by heating in a press at the temperature of 30 pounds steam pressure per square inch.

| Stock | Cure time in mins. | Modulus of elasticity in lbs./in.² at elongations of— | | Tensile at break in lbs./in.² | Ultimate elongation, per cent |
|---|---|---|---|---|---|
| | | 200% | 300% | | |
| C-1 | 75 | 1,340 | 2,368 | 2,500 | 315 |
| C-2 | 75 | 1,145 | 1,990 | 3,140 | 430 |
| C-1 | 90 | 1,340 | | 2,170 | 290 |
| C-2 | 90 | 1,130 | 1,950 | 2,730 | 400 |

The above data show the strong accelerating action typical of the preferred class of compounds.

A stock was compounded comprising

Stock D-1
Parts by weight
Buna S rubber _____ 100
Carbon black _____ 55
Zinc oxide _____ 5
Sulfur _____ 2
Stearic acid _____ 2
Zinc N-cyano methyl N-butyl dithiocarbamate _____ 1.0

The stock so compounded was cured by heating in a press at the temperature of 40 pounds of steam pressure per square inch.

| Stock | Cure time in mins. | Modulus of elasticity in lbs./in.² at elongations of— | | Tensile at break in lbs./in.² | Ultimate elongation, per cent |
|---|---|---|---|---|---|
| | | 300% | 400% | | |
| D-1 | 60 | 895 | 1,365 | 1,655 | 520 |
| D-1 | 90 | 912 | 1,480 | 1,850 | 500 |

The above data illustrate the accelerating action of accelerators in which the alkylene group of the cyano alkyl substituent is a methylene group.

The term "a rubber" as used in the attached claims is meant to include a sulfur vulcanizable plastic material which possesses high extensibility under load coupled with the property of forcibly retracting to approximately its original size and shape after the load is removed. Examples are india rubber, reclaimed rubber, balata, gutta percha and other natural or synthetically prepared sulfur vulcanizable products.

The present invention is not limited to the specific examples hereinbefore set forth wherein the new accelerators are preferred. Other ratios of the compounding ingredients than those mentioned in the examples as well as other well known fillers, pigments and the like may be employed in the production of various types of rubber compounds as will be apparent to those skilled in the art to which this invention pertains. This invention is limited solely by the claims attached hereto as part of the present specification.

What is claimed is:

1. The process of vulcanizing a rubber which comprises heating a rubber and sulfur in the presence of a compound containing the grouping

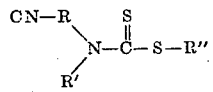

where R is an alkylene radical, R' is an alkyl radical and R'' represents a substituent of the class consisting of the radical

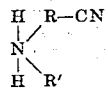

the radical

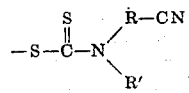

the radical

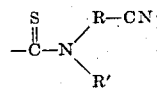

and metallic salt forming radicals.

2. The process of vulcanizing a rubber which comprises heating a rubber and sulfur in the presence of a compound containing the grouping

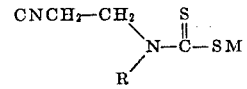

where R is an alkyl radical and M is a heavy metal salt forming element.

3. The process of vulcanizing a rubber which comprises heating a rubber and sulfur in the presence of a compound containing the grouping

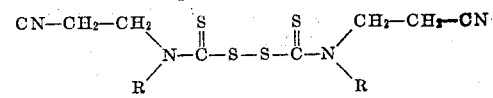

where R is an alkyl radical.

4. The process of vulcanizing a rubber which comprises heating a rubber and sulfur in the presence of a salt of a dithiocarbamic acid containing the grouping

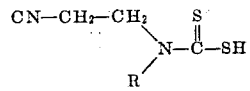

where R is an alkyl radical.

5. The process of vulcanizing a rubber which comprises heating a rubber and sulfur in the presence of a zinc salt of compound containing the grouping

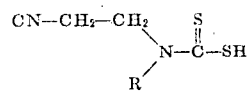

where R is an alkyl radical.

6. The process of vulcanizing a rubber which comprises heating a rubber and sulfur in the presence of a compound containing the grouping

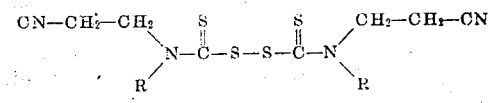

where R is a hydrocarbon radical containing more than one carbon atom and having an alkyl carbon atom linked to the nitrogen.

7. The process of vulcanizing a rubber which comprises heating a rubber and sulfur in the presence of a compound containing the grouping

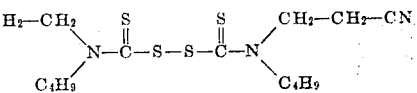

8. The process of vulcanizing a rubber which comprises heating a rubber and sulfur in the presence of the zinc salt of N-β-cyano ethyl N-butyl dithiocarbamic acid.

9. The process of vulcanizing a rubber which comprises heating a rubber and sulfur in the presence of the zinc salt of N-β-cyano ethyl N-cyclohexyl dithiocarbamic acid.

10. The vulcanized rubber product obtained by heating a rubber and sulfur in the presence of a compound containing the grouping

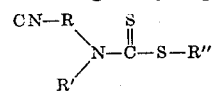

where R is an alkylene radical, R' is an alkyl radical and R'' represents a substituent of the class consisting of the radical

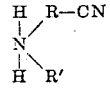

the radical

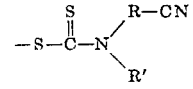

the radical

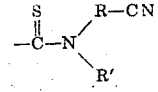

and metallic salt forming radicals.

11. The vulcanized rubber product obtained by heating a rubber and sulfur in the presence of a compound containing the grouping

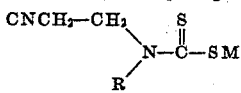

where R is an alkyl radical and M is a heavy metal salt forming element.

12. The vulcanized rubber product obtained by heating a rubber and sulfur in the presence of a compound containing the grouping

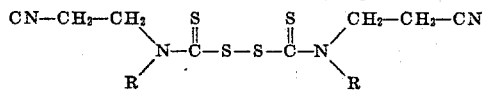

where R is an alkyl radical.

13. The vulcanized rubber product obtained by heating a rubber and sulfur in the presence of a salt of a dithiocarbamic acid containing the grouping

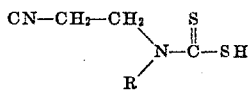

where R is an alkyl radical.

14. The vulcanized rubber product obtained by heating a rubber and sulfur in the presence of a zinc salt of compound containing the grouping

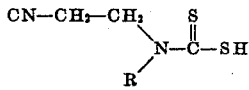

where R is an alkyl radical.

15. The vulcanized rubber product obtained by heating a rubber and sulfur in the presence of a compound containing the grouping

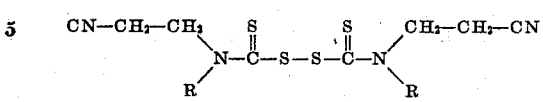

where R is a hydrocarbon radical containing more than one carbon atom and having an alkyl carbon atom linked to the nitrogen.

16. The vulcanized rubber product obtained by heating a rubber and sulfur in the presence of a compound containing the grouping

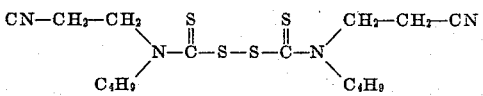

17. The vulcanized rubber product obtained by heating a rubber and sulfur in the presence of the zinc salt of N-β-cyano ethyl N-butyl dithiocarbamic acid.

18. The vulcanized rubber product obtained by heating a rubber and sulfur in the presence of the zinc salt of N-β-cyano ethyl N-cyclohexyl dithiocarbamic acid.

MARION W. HARMAN.